United States Patent

[11] 3,543,935

| [72] | Inventor | Robert P. Detrick<br>1203 N.E. 107th Place, Portland, Oregon 97220 |
|---|---|---|
| [21] | Appl. No. | 790,731 |
| [22] | Filed | Jan. 13, 1969 |
| [45] | Patented | Dec. 1, 1970 |

[54] COMBINATION FULL FLOW, SLOW FLOW OIL FILTER
6 Claims, 6 Drawing Figs.

[52] U.S. Cl. .................................................. 210/130,
210/315, 210/439, 210/443, 210/458, 210/494
[51] Int. Cl. ...................................................... B01d 29/04
[50] Field of Search........................................ 210/(P.F.F.F. & T.U. Digest), 439, 437, 440, 443, 130, 132, 137, 315, 457, 458, 484, 494

[56] References Cited
UNITED STATES PATENTS
| 2,463,137 | 3/1949 | Bahlke | 210/315X |
| 2,547,857 | 4/1951 | Cook | 210/439 |
| 2,559,267 | 7/1951 | Winslow et al. | 210/440X |
| 2,750,042 | 6/1956 | Wilkinson | 210/440X |

FOREIGN PATENTS
| 942,881 | 9/1948 | France | 210/130 |
| 1,113,654 | 12/1955 | France | 210/130 |

*Primary Examiner*—Reuben Friedman
*Assistant Examiner*—Frank A. Spear, Jr.
*Attorney*—Eugene M. Eckleman

ABSTRACT: A spin-on filter assembly having a removable holder receiving a hollow center slow flow or bypass filter cartridge. The holder has a substantially full or free flow of oil therearound and is enclosed on the sides and bottom by a sheet of coarse filter material. A sheet of finer filter material is provided between the slow flow filter cartridge and the holder at the sides and bottom of the latter. A restrictor plate is provided at the top of the holder to provide slow flow of oil to the filter cartridge. A relief valve is located directly at an inlet portion of the filter casing.

Patented Dec. 1, 1970

INVENTOR.
ROBERT P. DETRICK
BY Eugene M. Eckelman
ATTY.

Patented Dec. 1, 1970

INVENTOR.
ROBERT P. DETRICK
BY Eugene M. Eckelman
ATTY.

COMBINATION FULL FLOW, SLOW FLOW OIL FILTER

BACKGROUND OF THE INVENTION

Oil filters heretofore employed for engines are generally of two types. A first type comprises a substantially full or free flow system wherein the filter is in the main line of circulation and all the oil being pumped must pass through the filter. The other type is a bypass system wherein a small portion of the oil is bypassed from the main line and filtered, with the result that in time all the oil will pass through the filter and be cleaned.

In the beginning, the bypass filter was used exclusively for filtering oil in automobiles. The dense, plentiful filtering media provided an excellent trap for sa small dirt particles but since the system was a bypass system large particles sometimes circulated several times before entering the bypass filter. Early in the 1950's the need for immediate capture of the larger than 5 micron particles became evident, thus the conversion to the full flow filtering system. This eliminated the emphasis on the smaller particles and many of such particles were not filtered because of the coarse porosity of the full flow filters. Oil additives were developed to combat these smaller dirt and water impurities. Oil additives have helped but they have had limited ability against the tremendous volume of impurities produced through the combustion of gasoline or diesel. Bearing materials are now made less thick and much harder than in the past and closer tolerances are being used so that the extraction of super fine dirt particles is once again important.

A disadvantage of the bypass system is that it does not function properly in cold weather because the cold oil plugs the small filter passageways. In fact since the filters trap water, the latter will freeze, and the flow of oil may be completely stopped.

Both cotton and wood cellulose have been the major substances used in filtering. Wood cellulose has a greater absorption capacity for water than cotton cellulose; however it also has a tendency to "pulp" when highly saturated since water displaces the oil in paper more so than in cotton. High quality wood cellulose being available in a roll of tissue provides three important services, namely fine filtration, acid removal and economy.

SUMMARY OF THE INVENTION

The present filter was conceived for the purpose of overcoming the disadvantages enumerated above, and more particularly has as its principal objective to provide an improved filtering structure which catches all sizes of particles, such being accomplished by combining full flow and slow flow filtering media. Thus, the advantages of the full flow and bypass filtering are combined without incorporating any of the disadvantages of each system.

More particular objects of the present invention are to provide an oil filter which has means receiving a filter cartridge for accomplishing slow flow filtering and which has an outer passageway for accomplishing full flow filtering; to provide a holder for receiving a slow flow filter cartridge and employing a layer or sheet of filter material around the cartridge to prevent any fragments of the cartridge from possibly passing back into the engine; to provide another layer or sheet of filtering material exteriorly of the holder to provide a path for the full flow of oil along the inner surface of the casing but separate from the slow flow cartridge, to provide a novel restrictor plate structure on the inlet portion of the slow flow filter cartridge to provide slow flow feed of oil thereto; and to provide a novel system which operates efficiently in cold weather.

Another object is to provide an oil filter of the type described having a novel relief valve wherein if the full flow portion of the filter should become plugged the oil can bypass directly to the outlet around the filter.

The invention will be better understood and additional objects and advantages will become apparent from the following description which illustrate a preferred form of the device.

DETAILED DESCRIPTION OF PREFERRED EMBODIMENTS

Figure 1:
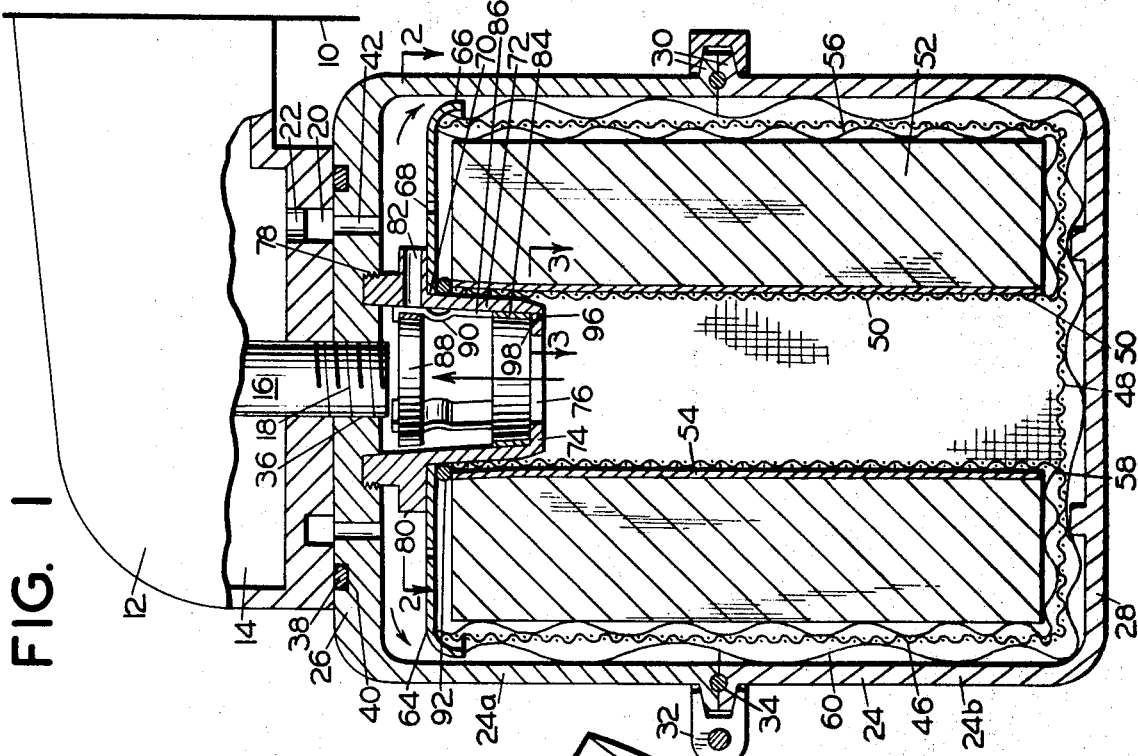
FIG. 1 is a longitudinal sectional view of a filter embodying principles of the present invention.
Figure 2:
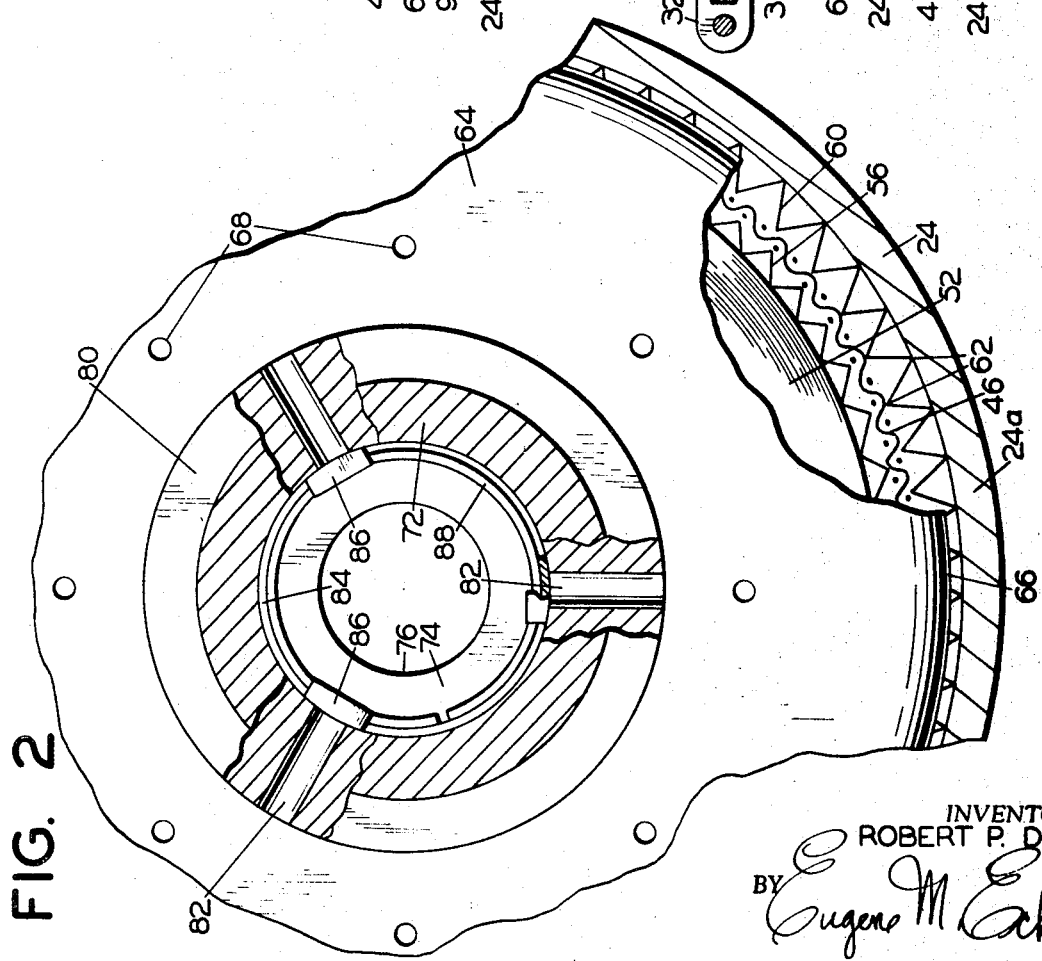
FIG. 2 is an enlarged, fragmentary sectional view taken on the line 2-2 of FIG. 1.
Figure 3:
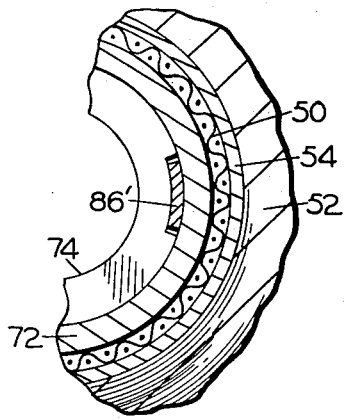
FIG. 3 is an enlarged fragmentary sectional view taken on the line 3-3 of FIG. 1.
Figure 4:
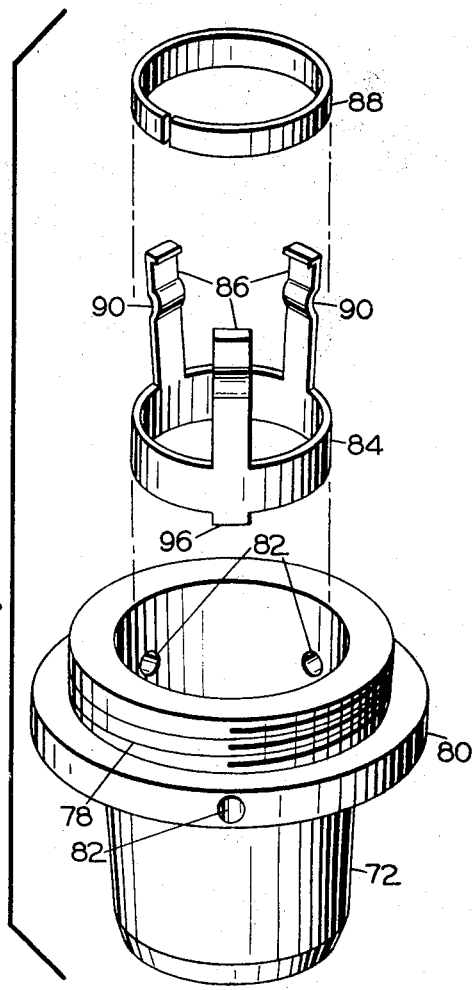
FIG. 4 is an enlarged exploded perspective view of relief valve means used in the filter.

Referring now in particular to the drawings and first to FIGS. 1 and 2, the numeral 10 designates an engine block and the numeral 12 designates a filter support housing of conventional construction arranged for securement to the engine block. Such housing includes an inlet area 14 to which oil is introduced from the engine oil pan by suitable pump means not shown. Housing 12 also includes a return pipe 16 which leads to the engine gallery. This pipe has a threaded portion 18 which projects beyond the end surface of the housing 12. An annular passageway 20 is provided in the end surface of the housing 12 and communicates with the inlet area by ports 22. The structure thus far described is conventional on engines using the full flow filter system wherein no exterior pipes are necessary but instead the oil flow and return from the engine are enclosed within the housing 12.

The present filter will now be described. It comprises a cylindrical casing or body member 24 having end walls 26 and 28. The body member 24 is split laterally between its ends, being formed of two parts 24a and 24 24b each having flanges 30 on their open ends serving to secure them together releasably by clamp means 32. An O-ring seal 34 is provided between the abutting ends of the casing parts to provide an oil tight seal.

End wall 26 has a threaded central bore 36 adapted for engagement with the threaded end 18 of the pipe 15 16, whereby the present filter can be mounted on the filter support housing 12 in the place of an existing spin-on filter merely by unthreading the latter and threadedly attaching the casing 24. The diameter of the threaded bore 36 is of selected dimension so as to fit the existing threaded projection 18. To provide an oil tight engagement of the casing 24 with the support housing 12, an O-ring seal 38 is contained in an annular recess 40 in the outer end surface of wall 26 for sealing engagement with the end surface of support housing 12. Disposed toward the center of the end wall 26 from the O-ring seal 38 are ports 42 arranged in a circular pattern and communicating with oil passageway 20. Thus, with the filter installed, oil is pumped from the engine to the support housing 12 and then into the interior of the casing 24 by means of oil inlets 20, 22 and 42.

Arranged to be removably received within the casing 24 is a reticulated holder or basket 46 which may be constructed of a screen material of metal or plastic, it being preferred that it be somewhat rigid for easy handling when installing and removing it from the filter casing. The holder 46 is open at the top and has a bottom wall 48. Such holder is of smaller diameter than the interior diameter of the casing 24, for a purpose to be described hereinafter, and has a reticulated hollow central extension or post 50 leading upwardly integrally from the bottom 48 of the holder. The top end of the extension is open.

Holder 48 is arranged to receive an open center cartridge 52 which as will be seen can comprise many different types of filters to accomplish a slow flow, fine filtering and which for the purpose of the present invention comprises a roll of toilet tissue having the usual center tubular core 54 of impervious material. In its filtering action, oil which is subjected to the upper end of the cartridge 52 filters down between the layers of the roll and discharges through the bottom, although it is to be understood that if other types of filters are used which do not have an impervious tubular core 54, the oil can move radially to the center of the holder.

Figure 5:
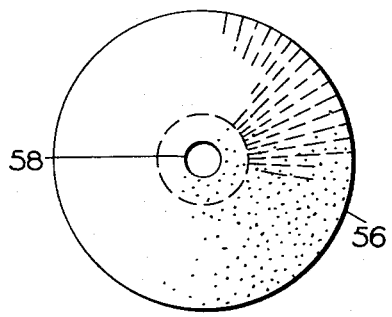
FIG. 5 is a plan view of a blank of filter paper from which a portion of the filter assembly is constructed.

The cartridge 52 comprises a first element of the filter assembly. A second element of the filter assembly comprises a layer 56 of filter material which may be nonwoven fabric such as a cotton viscose. Importantly, it is of fine porosity so as to filter the small particles. The layer 56 extends across the bottom and around the sides of the holder 46 but not across the top. For purposes of construction, the layer 56 may be formed of a round sheet or blank of filter material as shown in FIG. 5, and for placing it on the cartridge 52 it is merely folded up from the bottom to cover the bottom and sides of said cartridge. The filter 56 has a central aperture 58 for receiving the central extension 50 of the holder 46.

The filter assembly includes a third filter element comprising another layer 60 which assumes the same shape as the layer 56 but is disposed exteriorly of the holder 46. That is, the layer 60 extends across the bottom and up the sides of the holder 46 and across the top.

Figure 6:
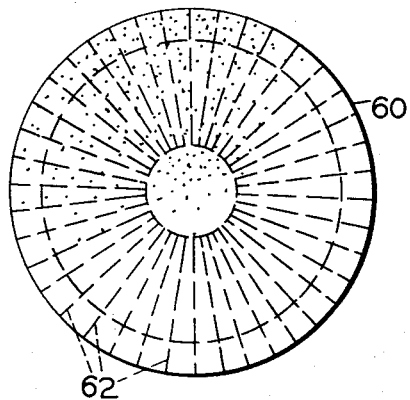
FIG. 6 is a view similar to FIG. 5 and showing a blank of filter paper from which another portion of the filter assembly is constructed.

This filter layer is of a coarse pr porosity so as to filter only the larger particles. It is constructed of a material which is very rugged, such as a nonwoven cotton or rayon fabric with bonded cellulosic qualities because of the large volume of oil which must pass therethrough. This latter filter portion is constructed of a round blank member as shown in FIG. 6 which can merely be folded up around the holder to cover the bottom and sides thereof.

In folding the layers 56 and 60 upwardly around their associated members, the paper must be folded or pleated to thus provide a maximum filtering surface. In fact the filter layer 60 may be prefolded, such as on fold lines 62 shown in FIG. 6 so that the pleats are formed before the filter portion 60 is placed around the holder 46. The same may be true of the filter layer 56 as associated with the cartridge 52.

Removably seated on the upper end of the holder 46 is a dislike restrictor plate 64 having a downturned outer lip 66 arranged to overlap a portion of the holder 46. As seen in FIG. 1, the diameter of the restrictor plate 64 is less than the inner diameter of the casing 24. This plate has a plurality of small apertures 68 through which oil to be filtered moves into engagement with the cartridge 52. The apertures 68 are of a selected size so as to provide a slow flow or bypass filtering through the cartridge 52 as will be described in greater detail hereinafter. Restrictor plate 64 has a central opening 70 through which projects a sleevelike valve support 72 having a bottom wall 74 provided with an opening 76. The upper end of the valve support 72 is open and has a threaded connection 78 with the top wall 26 of the casing 24 whereby the valve support can be removed if desired. The valve support also has a flange 80 intermediate its ends overlying an upper surface portion of the restrictor plate 64 and which have openings 82 arranged to provide direct communication between the inlet to the casing 24 and the outlet, such outlet comprising the interior portion of the valve support as communicating with the filter support pipe 16 on the filter support 12. Secured within the valve support 72 is a base ring 84 to which are integrated upright fingers 86 corresponding in number to the openings 82 and arranged to overlie respective ones of such openings to prevent flow of oil through said openings during normal operation. Fingers 86 are constructed of a springlike material and while lying tightly against the outlets of openings 82 they nevertheless can be unseated from their normal position by a greater than normal oil pressure. A flexible connecting ring 88 is secured to the fingers 86 around the inner surface thereof to reinforce the fingers but still permitting sufficient flexing of the latter to allow an excessive oil pressure to unseat them. Each of the fingers 86 has a lateral recess 90 on the outer surface thereof disposed just below the openings 82 whereby if any particles in the oil should be present at the inner end of the openings 82 when the fingers shut, such particles can escape through the recess 90 and not restrict closing of the fingers 86. An O-ring gasket 92 is provided on the valve support 72 just below the plate 64 to prevent leakage of oil between the plate and the flange 80. Base ring 84 has a bottom projecting tab 96 which fits in a recess 98 in wall 74 to prevent rotation of the ring, thus insuring that the fingers 86 will remain alined with openings 82.

OPERATION

The casing is charged with the filtering media by first placing the inner filter layer 56 around the bottom and sides of the cartridge 52 and the cartridge then inserted in the basket with the upright extension 50 fitted within the tubular core 54 of the cartridge and through the opening 58 in the filter layer 56. Thereupon the outer filter layer 60 is placed around the holder so as to cover the bottom and sides and the entire assembly can then be moved into engagement with the depending valve holder portion 72 and the restrictor plate wherein the said valve holder fits within the central extension 50 of the holder 46 and the restrictor plate abuts against the top edge of said holder. The entire casing 24 may be removed from the filter support 12 for installing a new filter assembly within the casing 24 although it is to be understood that merely the lower half or casing portion 24b may be removed from the upper casing portion 24a and the filter assembly removed and installed with the upper portion of the casing remaining in place on the support 12.

With the filter in place, oil is pumped in through the ports 22 and enters the casing 24 through the annular passageway 20 and the ports 42. A fast or full flow of oil flows around the outer side of the holder 46 and flows directly along the surface of the casing 24, along the bottom of the casing, up through the filter layer 60 below the central extension 50 and then discharges through said extension, the valve support 72 and return pipe 16. The flow of oil into the casing 24 and out is of selected arrangement such that the flow is not impeded in order that a full flow can always be insured. In the event that the full flow system show become plugged the greater than normal pressure will unseat the fingers 86 and allow a direct return of fluid which has entered the upper portion of the casing to return directly to the return pipe 16.

As the full flow of oil occurs as just described, a slow flow or bypass is urged through the cartridge 52. Such slow flow travels lengthwise through the cartridge, is discharged through the lower end thereof, and then passes through the filter layer 56 at the bottom of the cartridge for escape along the screen bottom 48 to the interior of the extension 50 and thus return to the return line. Where a cartridge 52 of the type is used which has an impervious tubular core 54, the slow flow of oil will occur as just described, but it is to be understood that where an impervious core is not used oil may not only travel longitudinally through the cartridge 52 but also laterally and escape into the outlet along the length of said cartridge. Thus, it is to be understood that although the present assembly has preferred usage with toilet tissue, other material for the cartridge 52 may be provided with or without an impervious tubular core 54.

Some of the full flow of oil around the outside of the holder will travel through the outer filter layer 60 whereupon it will then travel freely along the screen to the central outlet.

By means of the filtering action just described not only does full flow occur around the outside of the holder to maintain the full flow desired but also the larger particles cannot flush directly through since they are caught on the filter 60. While the full flow path does not filter out all the fine particles, such fine particles will in time be filtered out of the oil by the slow flow passage through the cartridge 52.

According to the present invention the present filter assembly has the advantage that it can be attached directly to the engine block without external oil lines and further contains the advantage that if the full flow system should become plugged the relief valve will maintain full flow. The bypass system at this time would of course still function. The large particles are filtered out on the outer layer 60. The slow flow of oil through the cartridge 52, which filters out the fine particles, does not have the disadvantage that it must be connected independently to the engine by means of external lines since it is associated with a full flow system. Where toilet tissue is used as the cartridge 52 oil must be discharged through the lower end thereof and since the inner layer 56 of the filter extends across the bottom of the cartridge there is no possibility that fragments or even lint which may break off from the cartridge can find their way into the engine. The portion of filter layer 56 which extends across the bottom of filter cartridge 52 protects such filtering material from the full flow portion of the filter.

The bypass or slow flow portion of the present filter will operate efficiently in cold weather because the full flow insulates the central portion of the filter and also warms the filter when the engine is started.

It is to be understood that the form of my invention herein shown and described is to be taken as a preferred example of the same and the various changes in the shape, size and arrangement of parts may be resorted to without departing from the spirit of my invention or the scope of the subjoined claims.

I claim:
1. A combination full flow, slow flow oil filter comprising:
 a. a casing having a pair of end walls;
 b. oil inlet means in said casing arranged to receive oil from an engine;
 c. oil outlet means in said casing for discharging filtered oil back to the engine;
 d. a holder in said casing constructed of substantially rigid reticulated material;
 e. a removable filtering element in said holder having inlet and outlet portions and arranged to accomplish slow flow filtering;
 f. a first layer of filter material disposed around the sides and across the outlet portion of said filtering element;
 g. a second layer of filter material disposed between the holder and the casing at the sides and bottom of the holder;
 h. said first layer of filter material being of a porosity to filter fine particles and said second layer of filter material being of a porosity to filter coarse particles;
 i. said holder having an outer dimension of less diameter than said casing whereby a path for the full flow of oil is formed between said casing and the said second layer of filter material on said holder;
 j. an apertured restrictor plate disposed across the inlet portion of said filtering element for allowing only slow flow of oil to said filtering element; and
 k. and relief valve means in said outlet means arranged to establish direct communication between said inlet and outlet means in the event the path of oil flow to the filter becomes plugged.

2. The oil filter of claim 1 wherein said holder has a tubular reticulated core portion forming an axial outlet portion from one end of the casing to the other.

3. The oil filter of claim 1 wherein said filtering element comprises a hollow-center roll of tissue disposed longitudinally in said holder and accomplishing a filtering function by movement of oil longitudinally therethrough.

4. The oil filter of claim 1 wherein said holder has a tubular reticulated core portion forming an axial outlet portion from one end of the casing to the other, said filtering element comprising a hollow-center roll of tissue disposed longitudinally in said holder and accomplishing a filtering function by movement of oil longitudinally therethrough, the core portion of said holder projecting through the hollow center of said filtering element.

5. The oil filter of claim 1 wherein said relief valve means includes:
 a. a support disposed between said inlet and outlet means;
 b. means defining at least one opening in said support establishing direct communication between said inlet means and said outlet means; and
 c. a spring finger on said support normally closing said opening on the outlet side of the filter and being arranged to be sprung open when pressure is built up on the inlet side of the filter by a plugged condition of said path of free flow.

6. The oil filter of claim 5 including means defining a recess in said finger adjacent to said opening arranged to receive particles which otherwise may catch between the finger and hold the spring finger open.